United States Patent
Wakahoi et al.

(10) Patent No.: US 7,476,459 B2
(45) Date of Patent: Jan. 13, 2009

(54) MEMBRANE ELECTRODE ASSEMBLY AND FUEL CELL

(75) Inventors: Toshiya Wakahoi, Utsunomiya (JP); Tetsuya Komori, Utsunomiya (JP); Masaaki Nanaumi, Utsunomiya (JP); Junichi Yano, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 528 days.

(21) Appl. No.: 11/022,404

(22) Filed: Dec. 22, 2004

(65) Prior Publication Data

US 2005/0142397 A1 Jun. 30, 2005

(30) Foreign Application Priority Data

Dec. 24, 2003 (JP) ............... 2003-426384
Mar. 15, 2004 (JP) ............... 2004-072734

(51) Int. Cl.
*H01M 4/90* (2006.01)
*H01M 2/08* (2006.01)

(52) U.S. Cl. ............... 429/40; 429/43; 429/34; 429/36

(58) Field of Classification Search ............ 429/34, 429/36, 38, 30, 40, 42, 43, 44
See application file for complete search history.

(56) References Cited

U.S. PATENT DOCUMENTS

| 5,176,966 | A | 1/1993 | Epp et al. |
| 5,464,700 | A | 11/1995 | Steck et al. |
| 2003/0049518 | A1 | 3/2003 | Nanaumi et al. |
| 2004/0170885 | A1* | 9/2004 | Gyoten et al. ......... 429/42 |
| 2006/0105219 | A1* | 5/2006 | Anderson ............ 429/34 |

FOREIGN PATENT DOCUMENTS

| JP | 2000-223136 | 8/2000 |
| JP | 2003-68323 | 3/2003 |

* cited by examiner

*Primary Examiner*—Raymond Alejandro
(74) *Attorney, Agent, or Firm*—Lahive & Cockfield, LLP; Anthony A. Laurentano, Esq.

(57) ABSTRACT

A membrane electrode assembly includes an anode, a cathode, and a solid polymer electrolyte membrane interposed between the anode and the cathode. The anode and the cathode include gas diffusion layers and electrode catalyst layers. Mixture layers are provided over predetermined areas H around surfaces of the electrode catalyst layers. The electrode catalyst layers and adhesive layers are mixed in the mixture layers, respectively.

8 Claims, 6 Drawing Sheets

MEMBRANE ELECTRODE ASSEMBLY AND FUEL CELL

BACKGROUND OF THE INVENTION

1. Field of the Invention

The present invention relates to a membrane electrode assembly including first and second electrodes and a solid polymer electrolyte membrane interposed between the first and second electrodes. Further, the present invention relates to a fuel cell including the membrane electrode assembly and a pair of separators sandwiching the membrane electrode assembly.

2. Description of the Related Art

Generally, a solid polymer fuel cell employs a solid polymer electrolyte membrane which is a polymer ion exchange membrane. The fuel cell includes an anode and a cathode, and the electrolyte membrane interposed between the anode and the cathode. The membrane electrode assembly is sandwiched between separators (bipolar plates). Each of the anode and the cathode is made of electrode catalyst and porous carbon. In use, typically, a predetermined number of fuel cells are stacked together to form a fuel cell stack.

In the fuel cell, a fuel gas such as a gas chiefly containing hydrogen (hereinafter also referred to as the hydrogen-containing gas) is supplied to the anode. The catalyst of the anode induces a chemical reaction of the fuel gas to split the hydrogen molecule into hydrogen ions and electrons. The hydrogen ions move toward the cathode through the electrolyte membrane, and the electrons flow through an external circuit to the cathode, creating a DC electric current. A gas chiefly containing oxygen or air (hereinafter also referred to as the oxygen-containing gas) is supplied to the cathode. At the cathode, the hydrogen ions from the anode combine with the electrons and oxygen to produce water.

In one structure of the membrane electrode assembly (hereinafter referred to as the first structure), the outer dimension of the solid polymer electrolyte membrane and the outer dimension of the anode and the cathode are the same. In another structure of the membrane electrode assembly (hereinafter referred to as the second structure), the outer dimension of the solid polymer electrolyte membrane is larger than the outer dimension of the anode and the cathode.

In order to reduce the overall size of the fuel cell, it is desirable to reduce the thickness of the solid polymer electrolyte membrane of the membrane electrode assembly. However, in the first structure, the position of the end surface of the solid polymer electrolyte membrane matches the position of the end surfaces of the anode and the cathode. Therefore, the fuel gas supplied to the anode and the oxygen-containing gas supplied to the cathode tend to flow around the end surface the solid polymer electrolyte membrane, and the fuel gas and the oxygen-containing gas may be mixed together undesirably. Further, the short circuit between the end surfaces of the anode and the cathode occurs easily.

In the second structure, the strength of the solid polymer electrolyte membrane is low at a portion extending beyond the end surfaces of the anode and the cathode. Therefore, the solid polymer electrolyte membrane is damaged easily.

In an attempt to address the problems, Japanese Laid-Open Patent Publication No. 2003-68323 discloses a membrane electrode assembly as shown in FIG. 6. The membrane electrode assembly includes a solid polymer electrolyte membrane 1, a gas diffusion electrode layer 2 provided over one surface of the solid polymer electrolyte membrane 1, and a gas diffusion electrode layer 3 provided on the other surface of the solid polymer electrolyte membrane 1. The surface area of the gas diffusion electrode layer 3 is smaller than the surface area of the gas diffusion electrode layer 2.

The gas diffusion electrode layers 2, 3 include catalyst layers 4a, 4b and gas diffusion layers 5a, 5b. The catalyst layers 4a, 4b contact both surfaces of the solid polymer electrolyte membrane 1. The dimension of the catalyst layer 4a is different from the dimension of the catalyst layer 4b. An adhesive layer 6 is formed around the catalyst layer 4a for joining the gas diffusion electrode layer 2 and the solid polymer electrolyte membrane 1 together.

In the conventional technique, a boundary portion exists between the outer end of the catalyst layer 4a and the inner end of the adhesive layer 6. The solid polymer electrolyte membrane 1 may be damaged undesirably by the boundary portion.

SUMMARY OF THE INVENTION

A main object of the present invention is to provide a membrane electrode assembly and a fuel cell in which it is possible to produce a thin solid polymer electrolyte membrane, and prevent the damage of the solid polymer electrolyte membrane, and the desired power generation performance is achieved.

The present invention provides a membrane electrode assembly for use in a fuel cell, and the membrane electrode assembly comprises first and second electrodes and a solid polymer electrolyte membrane interposed between the first and second electrodes. The surface area of the second electrode is larger than the surface area of the first electrode. Further, the present invention provides a fuel cell including the membrane electrode assembly and a pair of separators sandwiching the membrane electrode assembly. At least one of the first electrode and the second electrode is fixed to a surface of the solid polymer electrolyte membrane by an adhesive layer. A mixture layer is provided around a surface of an electrode catalyst layer of at least one of the first electrode and the second electrode, and the electrode catalyst layer and the adhesive layer are mixed in the mixture layer.

It is also preferable that at least one of the first electrode and the second electrode includes the electrode catalyst layer, a hydrophilic layer, and a hydrophobic layer, and a mixture layer is provided around surfaces of the hydrophilic layer and the hydrophobic layer. The adhesive layer is mixed in the mixture layer. The hydrophilic layer functions to maintain the sufficient moisture for maintaining the proton ion conductivity of the solid polymer electrolyte membrane, and the hydrophobic layer functions to supply water to the hydrophilic layer rapidly.

Further, it is preferable that the surface area of the electrode catalyst layer of the first electrode is different from the surface area of the electrode catalyst layer of the second electrode.

Further, the present invention provides a membrane electrode assembly for use in a fuel cell, and the membrane electrode assembly comprises a solid polymer electrolyte membrane and first and second electrodes attached to both surfaces of the solid polymer electrolyte membrane by an adhesive layer. Further, the present invention provides a fuel cell including the membrane electrode assembly and a pair of separators sandwiching the membrane electrode assembly. At least one of the first electrode and the second electrode includes an electrode catalyst layer provided on a surface of the solid polymer electrolyte membrane, a hydrophilic layer provided on the electrode catalyst layer, a hydrophobic layer provided on the hydrophilic layer, and a gas diffusion layer provided on the hydrophobic layer. A mixture layer is provided around surfaces of the electrode catalyst layer, the hydrophilic layer, and the hydrophobic layer. The adhesive layer is mixed in the mixture layer.

According to the present invention, since the mixture layer as the mixture of the electrode catalyst layer and the adhesive layer is provided around the surface of the electrode catalyst layer, no distinctive boundary portion exists between the electrode catalyst layer and the adhesive layer. Thus, it is possible to prevent the circumstance in which the solid polymer electrolyte membrane contacts the boundary portion between the electrode catalyst layer and the adhesive layer to cause the damage of the solid polymer electrolyte membrane. Further, since no clearance exists between the electrode catalyst layer and the adhesive layer, no excessive load is locally applied to the solid polymer electrolyte membrane.

The hydrophilic layer and the hydrophobic are provided on the electrode catalyst layer, and the mixture layer with the adhesive layer is provided around the electrode catalyst layer, the hydrophilic layer, and the hydrophobic layer.

Therefore, no distinctive boundary portion exists between the electrode catalyst layer, the hydrophilic layer and hydrophobic layer, and the adhesive layer.

Thus, it is possible to advantageously produce the thin solid polymer electrolyte membrane, and prevent the damage of the solid polymer electrolyte membrane. With the simple structure, it is possible to achieve the desired power generation performance.

The above and other objects, features and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Figure 1:
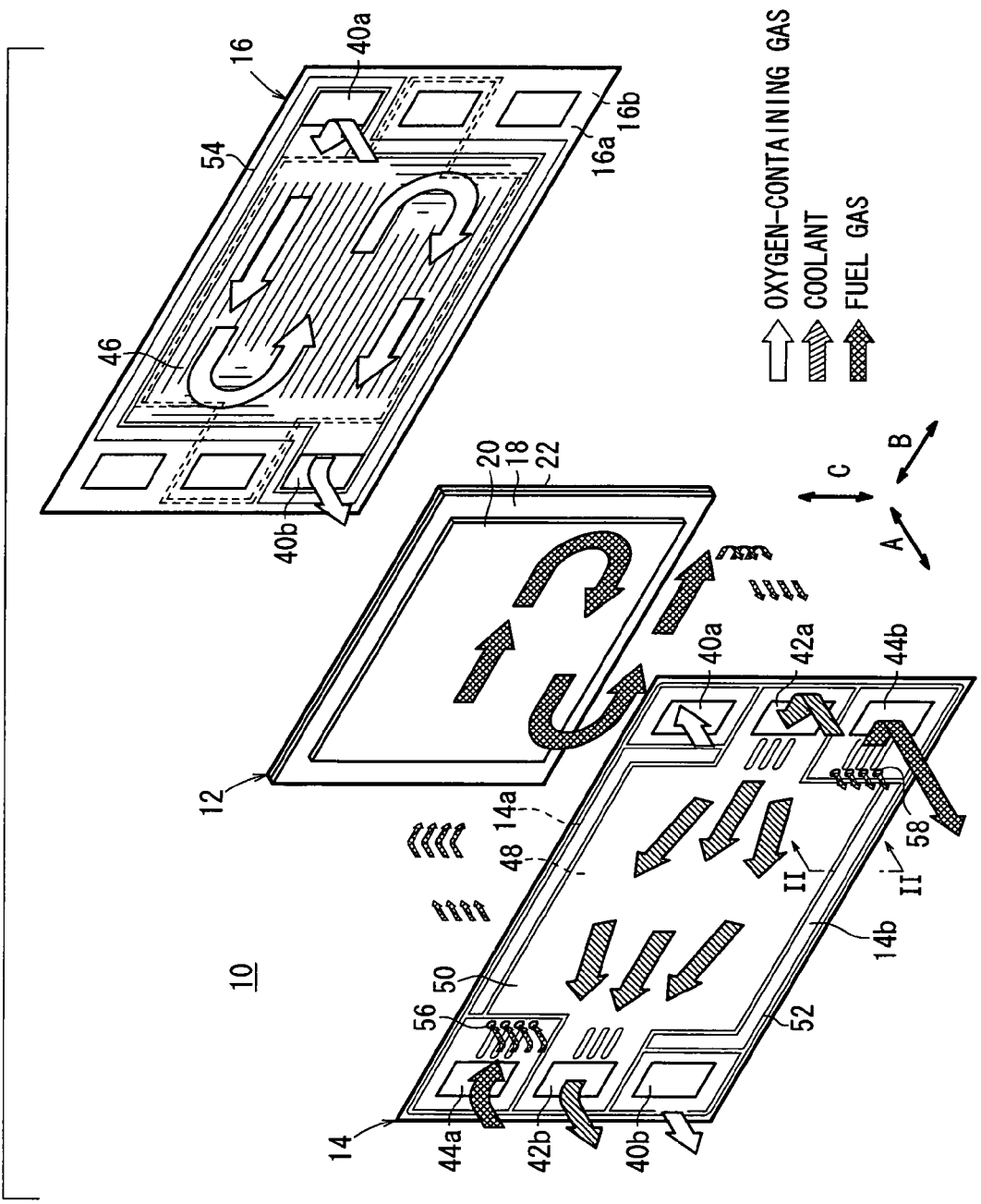
FIG. 1 is an exploded perspective view showing main components of a fuel cell according to a first embodiment of the present invention.
Figure 2:
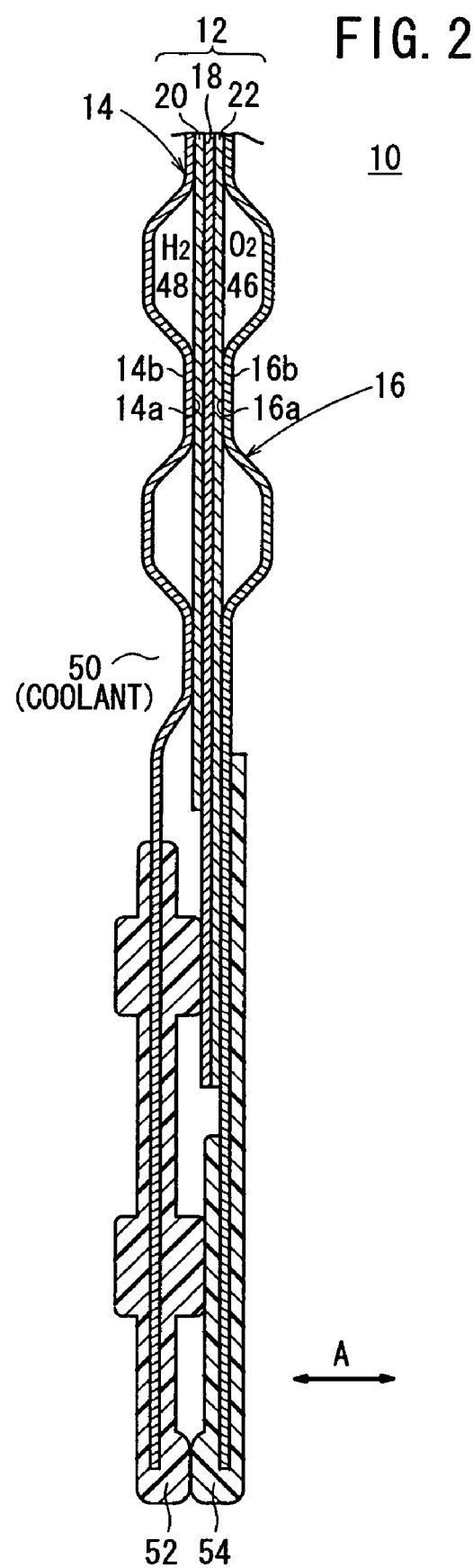
FIG. 2 is a cross sectional view showing the fuel cell, taken along a line II-II in FIG. 1.

FIG. 1 is an exploded perspective view showing main components of a fuel cell 10 according to a first embodiment of the present invention. FIG. 2 is a cross sectional view showing the fuel cell 10, taken along a line II-II in FIG. 1.

The fuel cell 10 includes a membrane electrode assembly 12 according to the embodiment of the present invention, and first and second separators 14, 16 sandwiching the membrane electrode assembly 12. For example, the first and second separators 14, 16 are steel plates, stainless steel plates, aluminum plates, plated steel sheets, or metal plates having anti-corrosive surfaces by surface treatment, or carbon materials.

The membrane electrode assembly 12 includes an anode (first electrode) 20, a cathode (second electrode) 22, and a solid polymer electrolyte membrane 18 interposed between the anode 20 and the cathode 22. The surface area of the anode 20 is smaller than the surface area of the cathode 22.

Figure 3:
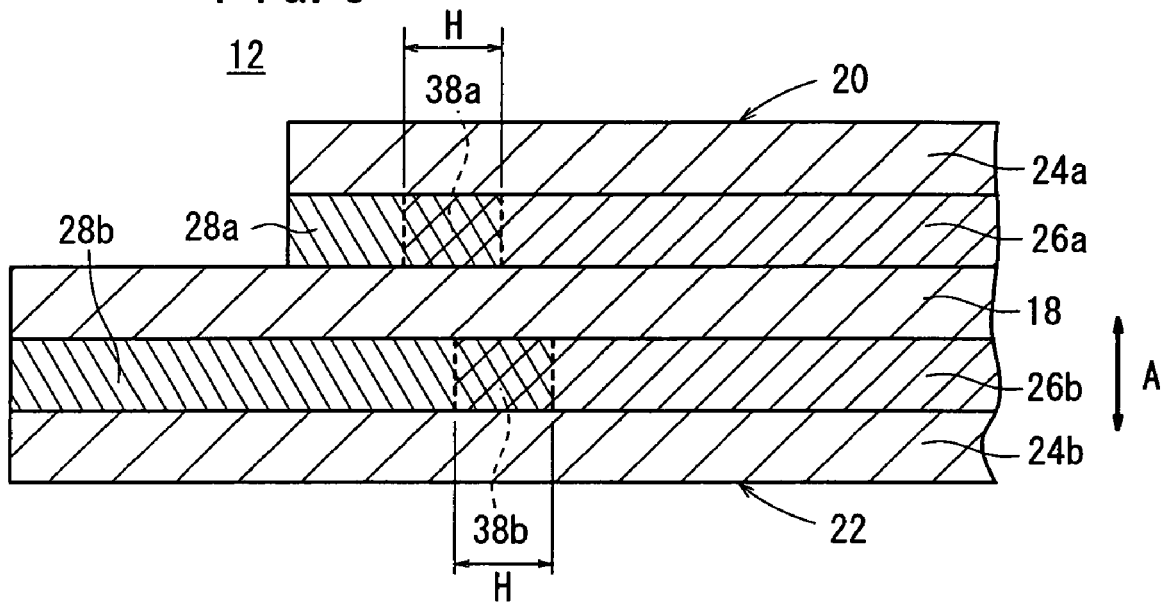
FIG. 3 is a cross sectional view showing part of a membrane electrode assembly of the fuel cell.

As shown in FIG. 3, the anode 20 includes a gas diffusion layer 24a and an electrode catalyst layer 26a stacked on the gas diffusion layer 24a, and the cathode 22 includes a gas diffusion layer 24b and an electrode catalyst layer 26b stacked on the gas diffusion layer 24b. The electrode catalyst layers 26a, 26b are joined to both surfaces of the solid polymer electrolyte membrane 18, and the gas diffusion layers 24a, 24b are attached to the solid polymer electrolyte membrane 18 through adhesive layers 28a, 28b. At least one of the gas diffusion layer 24a and the gas diffusion layer 24b may be attached to the solid polymer electrolyte membrane 18 through the adhesive layer 28a or the adhesive layer 28b. The mixture layers 38a and 38b are described below with reference to FIG. 4

Figure 4:
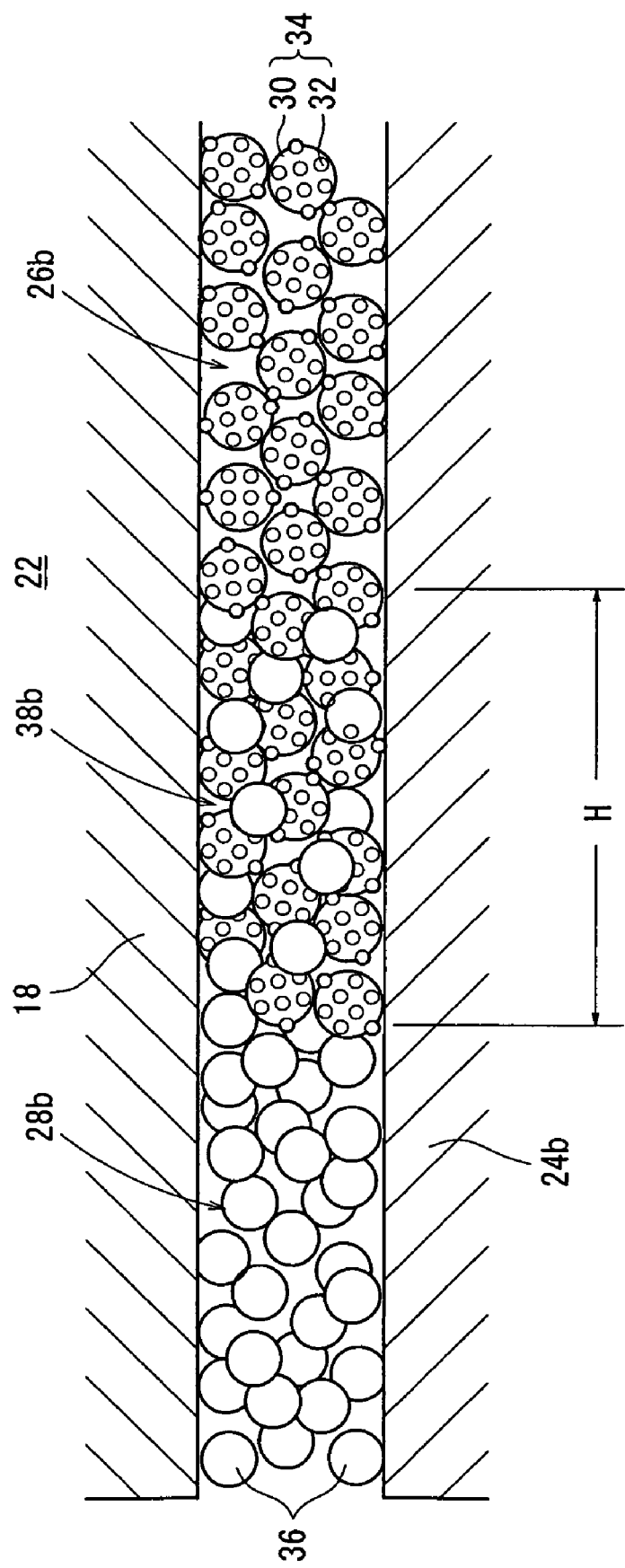
FIG. 4 is a view schematically showing a particle structure of a cathode of the membrane electrode assembly.

FIG. 4 schematically shows an exemplary particle structure of the cathode 22. The electrode catalyst layer 26b of the cathode 22 includes catalyst particles 34 supporting platinum particles 32 on porous carbon (carbon black) particles 30. The electrode catalyst layer 26b may further include ion exchange components.

For example, fluorine adhesive containing adhesive particles 36 may be used as the adhesive layer 28b. The adhesive layer 28b includes polysiloxane compounds and molecules including at least two alkenyl groups. A mixture layer 38b is provided around the surface of the electrode catalyst layer 26b. The mixture layer 38b is an area indicated by a predetermined distance H where the electrode catalyst layer 26b and the adhesive layer 28b are mixed together, i.e., the catalyst particles 34 and the adhesive particles 36 are mixed together.

The structure of the anode 20 is same as the structure of the cathode 22. A mixture layer 38a is provided around the surface of the electrode catalyst layer 26a. The mixture layer 38a is an area indicated a predetermined distance H (see FIG. 3) where the electrode catalyst layer 26a and the adhesive layer 28a are mixed together. Preferably, the mixture layer 38a is partially deviated from the mixture layer 38b, and the mixture layer 38a and the mixture layer 38b are not in alignment with each other in the stacking direction indicated by the arrow A.

As shown in FIG. 1, at one end of the fuel cell 10 in a horizontal direction indicated by the arrow B, an oxygen-containing gas supply passage 40a for supplying an oxygen-containing gas, a coolant supply passage 42a for supplying a coolant, and a fuel gas discharge passage 44b for discharging a fuel gas such as a hydrogen-gas are arranged vertically in the direction indicated by an arrow C. The oxygen-containing gas supply passage 40a, the coolant supply passage 42a, and the fuel gas discharge passage 44b extend through the fuel cell 10 in the direction indicated by the arrow A.

At the other end of the fuel cell 10 indicated by the arrow B, a fuel gas supply passage 44a for supplying the fuel gas, a coolant discharge passage 42b for discharging the coolant, and an oxygen-containing gas discharge passage 40b for discharging the oxygen-containing gas are arranged in the direction indicated by the arrow C. The fuel gas supply passage 44a, the coolant discharge passage 42b, and the oxygen-containing gas discharge passage 40b extend through the fuel cell 10 in the direction indicated the arrow A.

The second separator 16 has an oxygen-containing gas flow field 46 on its surface 16a facing the membrane electrode assembly 12. The oxygen-containing gas flow field 46 comprises a serpentine passage for allowing the oxygen-containing gas to flow back and forth in the direction indicated by the arrow B, and move downwardly. The oxygen-containing gas flow field 46 is connected to the oxygen-containing gas supply passage 40a and the oxygen-containing gas discharge passage 40b.

The first separator 14 has a fuel gas flow field 48 on its surface 14a facing the membrane electrode assembly 12. The fuel gas flow field 48 comprises a serpentine passage for allowing the fuel gas to flow back and forth in the direction indicated by the arrow B, and move downwardly indicated by the arrow C. The fuel gas flow field 48 is connected to the fuel gas supply passage 44a and the fuel gas discharge passage 44b.

A coolant flow field 50 is formed between a surface 14b of the first separator 14 and a surface 16b of the second separator 16. The coolant flow field 50 is connected to the coolant supply passage 42a and the coolant discharge passage 42b. For example, the coolant flow field 50 comprises a passage extending in the direction indicated by the arrow B.

As shown in FIGS. 1 and 2, a first seal member 52 is formed integrally on the surfaces 14a, 14b of the first separator 14 to cover (sandwich) the outer edge of the first separator 14, and a second seal member 54 is formed integrally on the surfaces 16a, 16b of the second separator 16 to cover (sandwich) the outer edge of the second separator 16. Each of the first seal member 52 and the second seal member 54 is made of seal material, cushion material or packing material such as EPDM (Ethylene Propylene Diene Monomer), NBR (Nitrile Butadiene Rubber), fluoro rubber, silicone rubber, fluoro silicone rubber, butyl rubber (Isobutene-Isoprene Rubber), natural rubber, styrene rubber, chloroprene rubber, or acrylic rubber.

As shown in FIG. 1, the first separator 14 has supply holes 56 connecting the fuel gas supply passage 44a to the fuel gas flow field 48 and discharge holes 58 connecting the fuel gas flow field 48 to the fuel gas discharge passage 44b.

Next, operation of producing the membrane electrode assembly 12 will be described.

Firstly, the solid polymer electrolyte membrane 18 is formed by a cast method using a solution of organic solvent of perfluoroalkylenesulfonic acid polymer compound or sulfonated polyarylene compound. Further, catalyst particles 34 supporting the platinum particles 32 on the surface of the porous carbon particles 30 are dispersed on an ion-conductive binder to prepare catalyst paste.

Mixture of the porous carbon particles 30 and polytetrafluoroethylene (PTFE) particles are dispersed uniformly in ethylene glycol to prepare slurry, and the slurry is deposited on one surface of the carbon paper. The slurry is dried to form a base layer. Each of the gas diffusion layers 24a, 24b is formed by the carbon paper and the base layer.

Then, catalyst paste is deposited on each base layer of the gas diffusion layers 24a, 24b at a position spaced internally by a predetermined distance from the end surface of the base layer. Before the catalyst layer is dried, the fluorine adhesive is applied on the base layer to form the adhesive layers 28a, 28b. At this time, the catalyst paste has not been dried. Therefore, it is possible to mix the fluorine adhesive in the catalyst paste. In this manner, the mixture layers 38a, 38b are formed by desirably mixing the electrode catalyst layer 26a and the adhesive layer 28a, and mixing the electrode catalyst layer 26b and the adhesive layer 28b.

The electrolyte catalyst layers 26a, 26b, and the adhesive layers 28a, 28b are dried to form the anode 20 and the cathode 22. The anode 20 and the cathode 22 are provided on both surfaces of the solid polymer electrolyte membrane 18. The electrode catalyst layer 26a contacts the adhesive layer 28a, and the electrode catalyst layer 26b contacts the adhesive layer 28b on both surfaces of the solid polymer electrolyte membrane 18. Under the condition, the solid polymer electrolyte membrane 18, the anode 20, and the cathode 22 are heated, and pressed together to form the membrane electrode assembly 12.

In the first embodiment, the mixture layers 38a, 38b as mixture of the electrolyte catalyst layer 26a and the adhesive layer 28a as mixture of the electrolyte catalyst layer 26b and the adhesive layer 28b are formed around the surface of the electrode catalyst layer 26a of the anode 20 and the surface of the electrode catalyst layer 26b of the cathode 22 over the predetermined areas H.

Thus, no distinctive boundary portion is formed between the electrode catalyst layer 26a and the adhesive layer 28a, and between the electrode catalyst layer 26b and the adhesive layer 28b. It is possible to prevent the damage or the like of the solid polymer electrolyte membrane 18 when the solid polymer electrolyte membrane 18 contacts the boundary portion between the electrode catalyst layer 26a and the adhesive layer 28a or the boundary portion between the electrode catalyst layer 26b and the adhesive layer 28b. Further, no clearance is formed at the boundary portion, and no excessive load is locally applied to the solid polymer electrolyte membrane 18.

Thus, in the first embodiment, it is possible to advantageously produce the thin solid polymer electrolyte membrane 18, and prevent the damage of the solid polymer electrolyte membrane 18. With the simple and economical structure, the desired power generation performance can be achieved.

Next, operation of the fuel cell 10 including the membrane electrode assembly 12 will be described.

Firstly, as shown in FIG. 1, an oxygen-containing gas is supplied to the oxygen-containing gas supply passage 40a, and a fuel gas such as a hydrogen-containing gas is supplied to the fuel gas supply passage 44a. Further a coolant such as pure water, an ethylene glycol or an oil is supplied to the coolant supply passage 42a.

Thus, the oxygen-containing gas flows from the oxygen-containing gas supply passage 40a into the oxygen-containing gas flow field 46 of the second separator 16. The oxygen-containing gas flows back and forth in the direction directed by the arrow B, and moves downwardly in a serpentine pattern along the cathode 22 of the membrane electrode assembly 12 for inducing an electrochemical reaction at the cathode 22. The fuel gas flows from the fuel gas supply passage 44a into the fuel gas flow field 48 of the first separator 14 through the supply holes 56. The fuel gas flows back and forth in the direction indicated by the arrow B, and moves downwardly in a serpentine pattern along the anode 20 of the membrane electrode assembly 12 for inducing an electrochemical reaction at the anode 20.

Thus, in each of the membrane electrode assemblies 12, the oxygen-containing gas supplied to the cathode 22, and the fuel gas supplied to the anode 20 are consumed in the electrochemical reactions at catalyst layers of the cathode 22 and the anode 20 for generating electricity.

The oxygen-containing gas consumed at the cathode 22 is discharged into the oxygen-containing gas discharge passage 40b in the direction indicated by the arrow A. Likewise, the fuel gas consumed at the anode 20 is discharged through the discharge holes 58 into the fuel gas discharge passage 44b in the direction indicated by the arrow A.

The coolant supplied to the coolant supply passage 42a flows into the coolant flow field 50 between the first separator 14 and the second separator 16 in the direction indicated by the arrow B. After the coolant is used for cooling the membrane electrode assembly 12, the coolant is discharged into the coolant discharge passage 42b.

Figure 5:
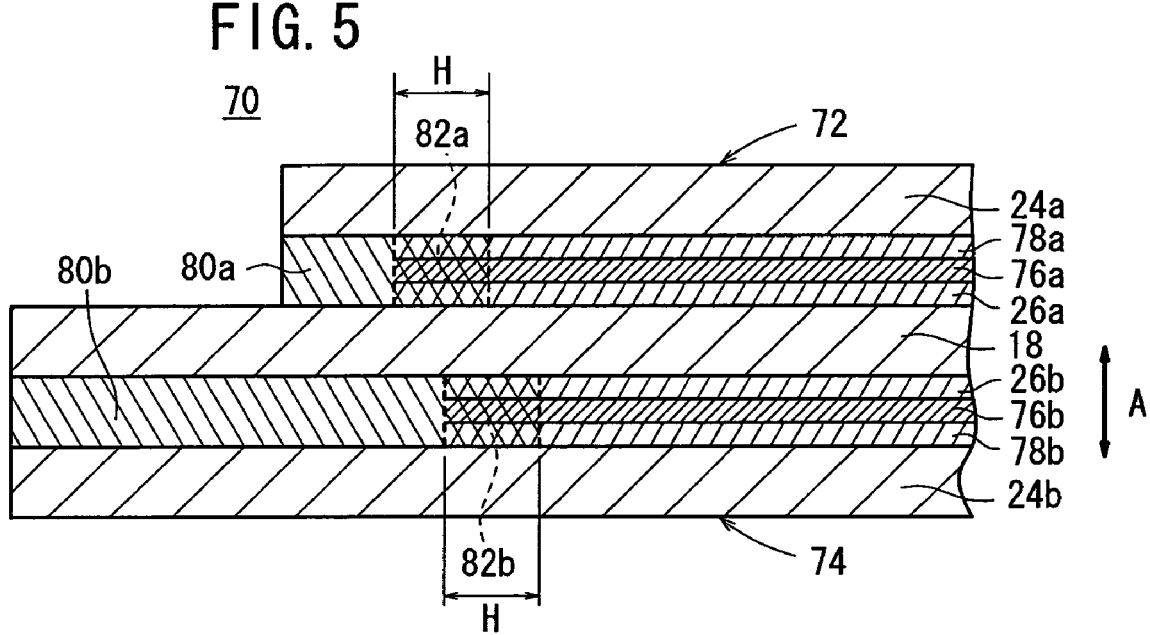
FIG. 5 is a cross sectional view showing part of a membrane electrode assembly of a fuel cell according to a second embodiment of the present invention.
Figure 6:
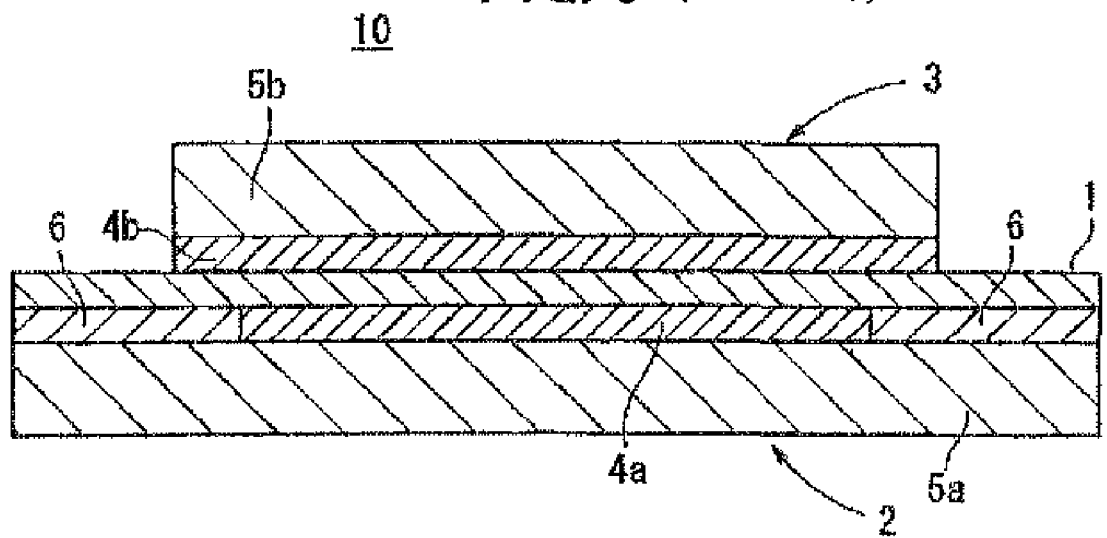
FIG. 6 is a view showing a conventional membrane electrode assembly.

FIG. 5 is a cross sectional view showing part of a membrane electrode assembly 70 of a fuel cell according to a second embodiment of the present invention. The constituent elements that are identical to those of the membrane electrode assembly 12 according to the first embodiment are labeled with the same reference numeral, and description thereof will be omitted.

The membrane electrode assembly 70 includes an anode (first electrode) 72, a cathode (second electrode) 74, and a solid polymer electrolyte membrane 18 interposed between the anode 72 and the cathode 74. The surface area of the anode 72 is smaller than the surface area of the cathode 74. However, the present invention is not limited in this respect. The surface area of the anode 72 may be same as the surface area of the cathode 74. Also in the first embodiment, the surface area of the anode 20 may be same as the surface area of the cathode 22.

The anode 72 includes an electrode catalyst layer 26a, a hydrophilic layer 76a provided on the electrode catalyst layer 26a, and a hydrophobic layer 78a provided on the hydrophilic layer 76a. Further, the anode 72 includes a gas diffusion layer 24a stacked on the hydrophobic layer 78a.

The cathode 74 includes an electrode catalyst layer 26b, a hydrophilic layer 76b provided on the electrode catalyst layer 26b, and a hydrophobic layer 78b provided on the hydrophilic layer 76b. Further, the cathode 74 includes a gas diffusion layer 24b stacked on the hydrophobic layer 78b.

Each of the hydrophilic layers 76a, 76b is a layer formed by adding aperture-forming material PM to ion-conductive polymer, and has high water retaining property. For example, copolymer of polytetrafluoroethylene (PTFE), polypyrrole, or polyaniline in the form of colloid particles in a dispersing medium may be used as the ion conductive polymer. Carbon, organic material such as methylcellulose, carboxylmetylcellulose, polyvinyl alcohol, cellulose, or polysaccharides may be used as the aperture-forming material PM.

In the second embodiment, mixture of carbon black powder and crystalline carbon fiber is used as the aperture forming material of the hydrophilic layer. Mixture of polytetrafluoroethylene (PTFE) and carbon black powder is used as the hydrophobic layers 78a, 78b. The electrode catalyst layer 26a, the hydrophilic layer 76a, and the hydrophobic layer 78a are attached to one surface of the solid polymer electrolyte membrane 18 through the adhesive layer 80a. The electrode catalyst layer 26b, the hydrophilic layer 78b, and the hydrophobic layer 78b are attached to the other surface of the solid polymer electrolyte membrane 18 through the adhesive layer 80b.

The mixture layer 82a is provided around surfaces of the electrode catalyst layer 26a, the hydrophilic layer 76a, and the hydrophobic layer 78a over an area indicated by a predetermined distance H. The electrode catalyst layer 26a, the hydrophilic layer 76a, the hydrophobic layer 78a, and the adhesive layer 80a are mixed in the mixture layer 82a. Likewise, the mixture layer 82b is provided around surfaces of the electrode catalyst layer 26b, the hydrophilic layer 76b, and the hydrophobic layer 78b over an area indicated by a predetermined distance H. The electrode catalyst layer 26b, the hydrophilic layer 76b, the hydrophobic layer 78b, and the adhesive layer 80b are mixed in the mixture layer 82b.

The hydrophilic layers 76a, 76b function to increase water retaining property between the electrode catalyst layers 26a, 26b and the gas diffusion layers 24a, 24b. Thus, it is possible to maintain the sufficient moisture for maintaining the proton conductivity of the solid polymer electrolyte membrane 18.

The hydrophobic layers 78a, 78b function to increase water discharging property. Thus, when humidified fuel gas and the oxygen-containing gas supplied from unillustrated separators are distributed in the gas diffusion layers 24a, 24b as the porous supporting layers, the condensed water is discharged smoothly, and it is possible to supply the water to the hydrophilic layers 76a, 76b rapidly.

In the second embodiment, since the mixture layers 82a, 82b are provided, no distinctive boundary portion exists between the electrode catalyst layer 26a, the hydrophilic layer 76a and the hydrophobic layer 78a, and the adhesive layer 80a, and between the electrode catalyst layer 26b, the hydrophilic layer 76b and the hydrophobic layer 78b, and the adhesive layer 80b. Therefore, the same advantages as with the first embodiment can be obtained. For example, it is possible to advantageously produce the thin solid polymer electrolyte membrane 18.

While the invention has been particularly shown and described with reference to preferred embodiments, it will be understood that variations and modifications can be effected thereto by those skilled in the art without departing from the spirit and scope of the invention as defined by the appended claims.

What is claimed is:

1. A membrane electrode assembly for use in a fuel cell, said membrane electrode assembly comprising:

first and second electrodes, wherein at least one of the first and second electrodes includes a catalyst layer formed of a catalyst material;

a solid polymer electrolyte membrane interposed between said first and second electrodes, wherein the catalyst layer contacts a first surface of the solid polymer electrolyte membrane;

an adhesive layer formed of an adhesive material, the adhesive layer adhering to the first surface of the solid polymer electrolyte membrane; and a mixture layer formed of the catalyst material and the adhesive material and having a predetermined thickness, the mixture layer contacting the first surface of the said polymer electrolyte membrane and being disposed between said electrode catalyst layer and said adhesive layer, wherein a peripheral surface of said electrode catalyst layer contacts a first peripheral surface of the said mixture layer, and a peripheral surface of said adhesive layer contacts a second peripheral surface of said mixture layer, wherein a density of the catalyst material decreases along the mixture layer from the first peripheral surface to the second peripheral surface of the mixture layer, and a density of the adhesive material increases along the mixture layer from the first peripheral surface to the second peripheral surface of the mixture layer.

2. A membrane electrode assembly according to claim 1, wherein at least one of said first electrode and said second electrode includes said electrode catalyst layer, a hydrophilic layer, and a hydrophobic layer; and said mixture layer is provided around surfaces of said hydrophilic layer and said hydrophobic layer, and said adhesive layer is mixed in said mixture layer.

3. A membrane electrode assembly according to claim 1, wherein surface area of said second electrode is larger than surface area of said first electrode.

4. A membrane electrode assembly according to claim 1, wherein surface area of said electrode catalyst layer of said first electrode is different from surface area of said electrode catalyst layer of said second electrode.

5. A fuel cell formed by sandwiching a membrane electrode assembly between a pair of separators, said membrane electrode assembly comprising:

first and second electrodes, wherein at least one of the first and second electrodes includes a catalyst layer formed of a catalyst material;

a solid polymer electrolyte membrane interposed between said first and second electrodes, wherein the catalyst layer contacts a surface of the solid polymer electrolyte membrane;

an adhesive layer formed of an adhesive material, the adhesive layer adhering to the surface of the solid polymer electrolyte membrane; and a mixture layer formed of the catalyst material and the adhesive material and having a predetermined thickness, the mixture layer contacting the surface of the solid polymer electrolyte membrane and being disposed between said electrode catalyst layer and said adhesive layer, wherein a peripheral surface of said electrode catalyst layer contacts a first peripheral surface of the said mixture layer, and a peripheral surface of said adhesive layer contacts a second peripheral surface of said mixture layer, wherein a density of the catalyst material decreases along the mixture layer from the first peripheral surface to the second peripheral surface of the mixture layer, and a density of the adhesive material increases along the mixture layer from the first peripheral surface to the second peripheral surface of the mixture.

6. A fuel cell according to claim 5, wherein at least one of said first electrode and said second electrode includes said electrode catalyst layer, a hydrophilic layer, and a hydrophobic layer; and said mixture layer is provided around surfaces of said hydrophilic layer and said hydrophobic layer, and said adhesive layer is mixed in said mixture layer.

7. A fuel cell according to claim 5, wherein surface area of said second electrode is larger than surface area of said first electrode.

8. A fuel cell according to claim 5, wherein surface area of said electrode catalyst layer of said first electrode is different from surface area of said electrode catalyst layer of said second electrode.

* * * * *